United States Patent
Ozawa et al.

(10) Patent No.: US 7,336,001 B2
(45) Date of Patent: Feb. 26, 2008

(54) DOOR LOCK CONTROL DEVICE

(75) Inventors: Takao Ozawa, Toyota (JP); Kouichi Masamura, Toyota (JP); Yoshihide Nakane, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 336 days.

(21) Appl. No.: 11/116,266

(22) Filed: Apr. 28, 2005

(65) Prior Publication Data

US 2005/0258944 A1    Nov. 24, 2005

(30) Foreign Application Priority Data

May 18, 2004   (JP)   ............... 2004-147660

(51) Int. Cl.
  *B60R 25/00*   (2006.01)
  *E05B 53/00*   (2006.01)
  *E05B 65/12*   (2006.01)

(52) U.S. Cl. ............... 307/10.2; 340/426.11; 340/428; 70/262; 70/263; 70/265

(58) Field of Classification Search ........... 340/426.11, 340/428; 307/10.2; 70/262, 263, 265
See application file for complete search history.

(56) References Cited

U.S. PATENT DOCUMENTS 4,933,664 A   6/1990   Igawa et al.
5,519,376 A * 5/1996   Iijima .................. 340/426.35
5,534,846 A   7/1996   Kuroda
5,621,251 A * 4/1997   Yamazaki .................. 307/10.2
5,699,250 A * 12/1997  Kobayashi .................. 701/48
5,887,466 A   3/1999   Yoshizawa
6,879,247 B2 * 4/2005  Shimomura et al. ... 340/426.18

FOREIGN PATENT DOCUMENTS

| DE | 101 34 120 A1 | 1/2003 |
|----|---------------|--------|
| JP | A-06-108728 | 4/1994 |
| JP | B2 2739671 | 1/1998 |
| JP | B2 3362604 | 10/2002 |
| WO | WO 03/081429 A1 | 10/2003 |

OTHER PUBLICATIONS

U.S. Appl. No. 10/504,189, filed Aug. 11, 2004, Abe.

* cited by examiner

*Primary Examiner*—Michael Sherry
*Assistant Examiner*—Hal I Kaplan
(74) *Attorney, Agent, or Firm*—Oliff & Berridge, PLC

(57) ABSTRACT

A door lock control device prevents deterioration in anti-theft property of a vehicle by restricting unjust cancellation of a locked state of a door of the vehicle. In-vehicle operation detecting means detects a predetermined operation performed in a compartment of the vehicle. Locked state canceling means cancels the locked state of the door when the predetermined operation is detected by the in-vehicle operation detecting means. Unjust act detecting means detects an unjust act applied to the vehicle. Locked state cancellation prohibiting means prohibits cancellation of the locked state by the locked state canceling means after the unjust act is detected by the unjust act detecting means.

4 Claims, 2 Drawing Sheets

DOOR LOCK CONTROL DEVICE

BACKGROUND OF THE INVENTION

1. Field of the Invention

The present invention relates to door lock control device and, more particularly, to a door lock control device that unlocks a vehicle door when a predetermined operation in a vehicle compartment is detected such as, for example, an engine starting operation.

2. Description of the Related Art

Conventionally, there is known a door apparatus, such as disclosed in Japanese Patent Publication No. 2739671, that has a so-called double lock mechanism which causes a link to be incapable of switching between locking and unlocking a vehicle door by using, for example, an electric motor. In such a door apparatus, after the double lock mechanism operates and a vehicle door is set in a double-locked state, the double-locked state can be cancelled by a regular unlocking operation while cancellation of the double-locked state cannot be done by an unjust operation to the above-mentioned link. Therefore, according to the above-mentioned door apparatus, it is possible to improve the theft-proof function of a vehicle with respect to an unjust unlocking operation applied to a vehicle door.

However, if the cancellation of the double-locked state is performed only by the regular unlocking operation as mentioned above and when a vehicle door is double-locked in a state where a regular passenger remains in the vehicle compartment, there occurs a problem in that the passenger is confined in the vehicle compartment. Thus, in the above-mentioned door apparatus, the double-locked state can also be cancelled by an ignition operation. Therefore, according to the above-mentioned door apparatus, it is possible to prevent a regular passenger from being confined in a vehicle compartment due to double locking of a vehicle door.

That is, in the above-mentioned system, the cancellation of the double-locked state of a vehicle door can be achieved also by an ignition operation. For this reason, the double-locked state can be cancelled even when a third person or an unknown person, who is not a regular passenger, gets in the vehicle compartment and turn on an ignition switch unjustly, which deteriorates the anti-theft property of the vehicle.

SUMMARY OF THE INVENTION

It is a general object of the present invention to provide a door lock control device in which the above-mentioned problems are eliminated.

A more specific object of the present invention is to provide a door lock control device which prevents deterioration in anti-theft property of a vehicle by restricting unjust cancellation of a locked state of a door of the vehicle.

In order to achieve the above-mentioned objects, there is provided according to the present invention a door lock control device that controls a locked state of a door of a vehicle, comprising: in-vehicle operation detecting means for detecting a predetermined operation performed in a compartment of the vehicle; locked state canceling means for canceling the locked state of the door when the predetermined operation is detected by the in-vehicle operation detecting means; unjust act detecting means for detecting an unjust act applied to the vehicle; and locked state cancellation prohibiting means for prohibiting cancellation of the locked state by the locked state canceling means after the unjust act is detected by the unjust act detecting means.

In the present invention, the cancellation of the door of the vehicle is performed when the predetermined operation is detected in the compartment of the vehicle. When the unjust act is applied to the vehicle, there is high possibility that an unknown person or a third person unjustly enters the compartment of the vehicle and performs a starting operation of a power source of the vehicle. Thus, in the present invention, the unjust act applied to the vehicle is detected. Then, the above-mentioned cancellation of the locked state cannot be performed if the unjust act is detected even when the predetermined operation is detected in the compartment of the vehicle. Therefore, even if an unknown person or a third person unjustly enters the compartment of the vehicle and performs the predetermined operation, the cancellation of the locked state of the door is prohibited and the locked state is maintained. Thus, unjust cancellation of the locked state of the door of the vehicle is restricted, thereby preventing deterioration in anti-theft property of the vehicle.

In the door lock control device according to the present invention, the locked state cancellation prohibiting means may prohibits the cancellation of the locked state when the unjust act is detected by the unjust act detecting means and when the predetermined operation is detected by the in-vehicle operation detecting means.

In the door lock control device according to the present invention, the unjust act detecting means may detect an unjust break-in to the compartment of the vehicle.

Additionally, in the door lock control device according to the present invention, the door may be capable of being set in one of a first locked state and a second locked state where the second locked state provides anti-theft property higher than the first locked state, and the locked state canceling means may cancel the second locked state when the predetermined operation is detected by the in-vehicle operation detecting means under a condition where the door is set in the second locked state.

Further, in the door lock control device according to the present invention, the in-vehicle operation detecting means may detect one of a start state where a power source of the vehicle is started and a start permission state where a start of the power source of the vehicle is permitted. The start state may be an ignition-on state where an ignition switch is turned on to start an engine. The start permission state may be an engine start permission state where a start of an engine is permitted after completion of code check by an immobilizer system.

Other objects, features and advantages of the present invention will become more apparent from the following detailed description when read in conjunction with the accompanying drawings.

DETAILED DESCRIPTION OF THE PREFERRED EMBODIMENT

Figure 1:
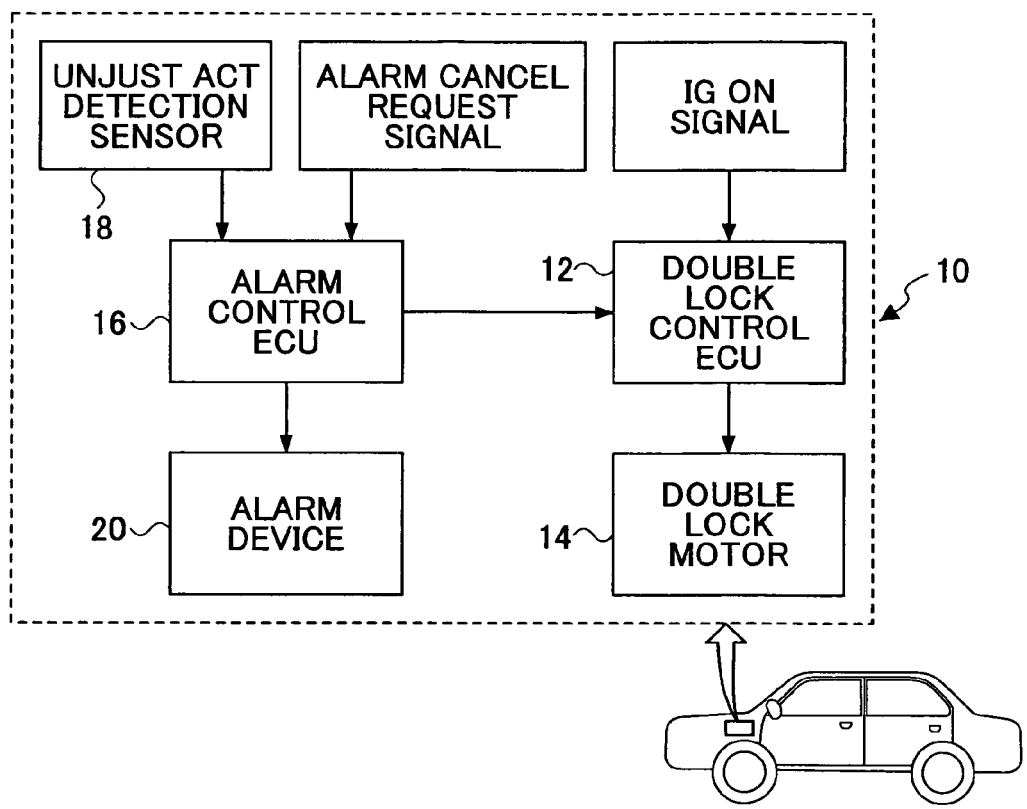
FIG. 1 is a block diagram of an in-vehicle system equipped with a door lock control device according to an embodiment of the present invention.

FIG. 1 is a block diagram of an in-vehicle system equipped with a door lock control device according to an embodiment of the present invention. As shown in FIG. 1, the in-vehicle system according to the present embodiment comprises the door lock control device 10 that controls locking and unlocking of a door of a vehicle. The door lock control device 10 is configured and arranged to be capable of switching a locked state of the vehicle door between two stages, one being a normal locked state and the other being a locked state (hereinafter, referred to as a double-locked state) where anti-theft property is higher than that in the normal locked state.

It should be noted that the normal locked state refers to a state where a door cannot be opened by an operation of an outside handle or an inside handle of the vehicle door and where the door lock can be cancelled by operating a lock knob provided in a vehicle compartment to unlock the door. On the other hand, the double-locked state refers to a state where a door cannot be opened by operating the outside handle or the inside handle of the vehicle door and where the door lock cannot be cancelled even by operating the lock knob provided in the vehicle compartment to unlock the door.

Figure 2:
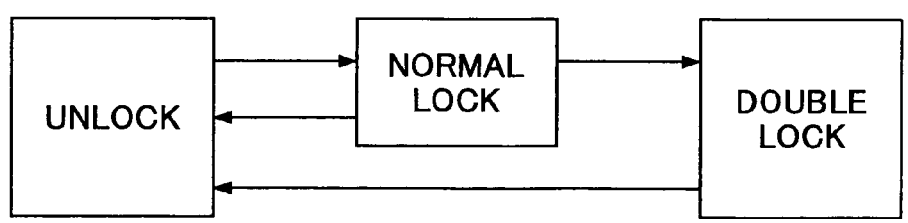
FIG. 2 is an illustration showing time transition of an unlocked state, a normal locked state and a double-locked state of a vehicle door in the door lock control device according to the present invention.

FIG. 2 is an illustration showing time transition of an unlocked state, a normal locked state and a double-locked state of a vehicle door in the door lock control device 10 according to the present embodiment. The door lock control device 10 is capable of determining 1) existence of a locking/unlocking operation by a vehicle key, which serves as a portable equipment necessary for performing a vehicle operation by an occupant of a vehicle such as an engine start or a door lock/unlock, being mechanically inserted into a door key cylinder; 2) existence of remote locking/unlocking operation with respect to a vehicle key by an occupant of a vehicle; or 3) result of code check according to wireless communication between a vehicle key while an occupant of a vehicle brings the vehicle key provided with an authentication code. The door lock control device 10 usually performs switching between the unlocked state, the normal locked state and the double-locked state with respect to all doors provided in a vehicle based on the results of the authentication check. It should be noted that the door lock control device 10 switches from the unlocked state or the normal locked state to the double-locked state only when a predetermined operation (for example, a remote operation to request the double-lock with respect to a vehicle key) is applied in a condition where a vehicle door is set in the unlocked state or the normal locked state.

As shown in FIG. 1, the door lock control device 10 is provided with an electronic control unit 12 for double lock control (hereinafter, referred to as a double lock control ECU 12). A double lock motor 14 is connected to the double lock control ECU 12. The double lock motor 14 has a function to switch the state of a vehicle door between the normal locked state and the double-locked state in accordance with a driven state thereof. The double lock control ECU 12 issues an instruction to the double lock motor 14 to execute or cancel the double lock when the double lock is requested under the unlocked state or the normal locked state and when the normal lock or the unlock is requested by canceling the double lock. The double lock motor 14 performs execution or cancellation of the double lock in accordance with the instruction supplied by the double lock control ECU 12.

An ignition-on signal (IG ON signal) is supplied to the double lock control ECU 12. The supply of the ignition-on signal is performed, when an ignition-on operation is performed to start an engine, which is a power source of the vehicle, in a state where the vehicle key is inserted in an ignition key cylinder. The double lock control ECU 12 detects a state where the ignition is turned on based on the ignition-on signal.

In a state where double lock is achieved by an operation of the double lock motor 14, the double lock control ECU 12 cancels the double lock when it is determined that a mechanical unlocking operation is performed by an occupant of the vehicle as in the above-mentioned item 1), a remote unlocking operation is performed by an occupant of the vehicle as in the above-mentioned item 2), or a so-called smart unlock based on the code check result is performed as in the above-mentioned item 3). Further, in a state where the double-lock is achieved, when the ignition-on signal which indicates an ignition ON state is supplied, the double lock control ECU 12 drives the double lock motor 14 so as to cancel the double lock.

Thus, in the door lock control device 10, the double-locked state, which is different from the normal locked state, is another method for locking a vehicle door. As mentioned above, the double-locked state has a level of anti-theft property higher than that of the normal locked state since door lock cannot be cancelled eve if a lock knob provided in the vehicle compartment is operated for unlocking. Therefore, according to the door lock control device 10 of the present embodiment, it is possible to improve anti-theft property of a vehicle with respect to an unjust unlocking operation applied to a vehicle door. It should be noted that the cancellation of the double lock can be achieved by a regular unlocking operation or a smart-unlocking operation. Therefore, it is possible to achieve the above-mentioned improvement in the anti-theft property of a vehicle without deteriorating convenience for regular occupant of a vehicle getting in or out of the vehicle.

Moreover, as mentioned above, the door lock cannot be cancelled under the double-locked state even if an unlocking operation is applied to the lock knob or the like provided in the vehicle compartment. On the other hand, in the door lock control device 10 of the present embodiment, the cancellation of double lock can be achieved by execution of an ignition-on operation. For this reason, it is possible for the regular occupant of the vehicle to cancel the double-locked state even when the vehicle door is double-locked while the regular occupant is confined in the vehicle compartment. Therefore, according to the door lock control device 10 of the present embodiment, it is possible to prevent a regular occupant of a vehicle from being confined in a vehicle compartment due to double-locking of a vehicle door.

Moreover, the in-vehicle system according to the present embodiment comprises an electronic control unit 16 for alarm control (hereinafter, referred to as an alarm control ECU 16) connected to the above-mentioned double-lock control ECU 12. The alarm control ECU 16 determines whether or not all vehicle doors are closed and locked in a state where a vehicle key, which is carried by an occupant of the vehicle, is not inserted into an ignition key cylinder of the vehicle. Then, if it is determined that all the vehicle doors are closed and locked in the state where the vehicle key is not inserted, a shift is made from a mode for cancellation of alarming against a stealing act for the vehicle itself and vehicle components such as tires, an engine, or the like (hereinafter, referred to as an unvigilant mode) to a mode for watching for vehicle theft (hereinafter, referred to as an alarm mode). Thereafter, if one of the vehicle doors is normally unlocked or a normal engine start is performed in the alarm mode, a shift is made from the alarm mode to the unvigilant mode.

Referring to FIG. 1, an unjust act detection sensor 18 is connected to the alarm control ECU 16. As for the unjust act detection sensor 18, there are used a break-in sensor, an inclination sensor, etc., that detect window glass breaking, unjust vehicle shaking, vibration and sound generated by towing a vehicle by a wrecking car, etc. The alarm control ECU 16 detects, by using the unjust act detection sensor 18, an act (especially, break-in by breaking a glass) for attempting vehicle theft.

Additionally, an alarm device 20 mounted on the vehicle is connected to the alarm control ECU 16. The alarm control ECU 16 supplies an actuation signal for announcing vehicle theft in a surrounding area of the vehicle to the alarm device 20 when the alarm control ECU 16 detects a vehicle theft action in the alarm mode by using the unjust act detection sensor 18. The alarm device 20 gives an alarm to the surrounding area of the vehicle to announce that vehicle theft is being performed in accordance with the actuation signal supplied by the alarm control ECU 16. Specifically, the alarm device 20 gives an alarm toward outside the vehicle by activating a siren, a horn or a buzzer, lighting various lamps such as a hazard lamp, or warning by a voice announcement. It should be noted that the alarm device 20 connected to the alarm control ECU 16 may be a part of the siren or the horn, either singular or in combination thereof.

As mentioned above, in the system according to the present embodiment, when vehicle theft happens when the alarm mode is set, alarming against the vehicle theft action is performed by the alarm device 20. In this case, a person in the surrounding area of the vehicle can be made aware of the vehicle theft action being performed. Therefore, according to the system of the present embodiment, vehicle theft can be prevented by giving an alarm by the alarm device 20 in the alarm mode.

It should be noted that a communication device, which is capable of communicating with a predetermined information center, may be connected to the alarm control ECU 16 in addition to or instead of the alarm device 20. In this case, the alarm control ECU 16 supplies the actuation signal to the communication device so as to notify the predetermined information center of the vehicle theft action being performed by adding ID information of the vehicle or ID information of a user of the vehicle. The communication apparatus establishes a communication channel with the information center through a communication network using a predetermined radio frequency in accordance with the actuation signal supplied by the alarm control ECU 16, and sends notification to the information center via wireless communication that vehicle theft has been performed together with the ID information of the vehicle or the vehicle user. Upon receipt of the notification regarding the vehicle theft action from the in-vehicle system, the information center discriminates the previously registered regular user of the vehicle based on the ID information contained in the notification information, and sends a notification to a portable terminal carried by the regular user of the vehicle by a call or electronic mail to notify the regular user of the fact that the vehicle theft action has been performed. Upon receipt of the notification regarding the vehicle theft action from the information center, the portable terminal displays the fact of the notification on a display unit or outputs a voice message through a speaker.

In the above-mentioned system, when a vehicle theft action is performed on a vehicle that is set in the alarm mode, a regular user of the vehicle can be aware of the fact that own vehicle met a theft action even when the user is away from the vehicle since a notification regarding the vehicle theft action is sent to the regular user of the vehicle from the in-vehicle system to the information center through user. Therefore, according to the above-mentioned system, the regular user of the vehicle can take measures for the vehicle theft action quickly, which improves the vehicle anti-theft function.

After the alarm control ECU 16 causes the alarm device 20 to give an alarm if a vehicle theft action is detected using the unjust act detection sensor 18 when the alarm mode is set, the alarm control ECU 16 supplies information to the double lock control ECU 12 that indicates that an alarm has bee given, that is, the vehicle theft action has been performed. The double lock control ECU 12 detects the fact that there is a record or history of alarming, that is, there exists information regarding a vehicle theft action in accordance with the above-mentioned information supplied by the alarm control ECU 16.

Moreover, an alarm cancel request signal for requesting cancellation of alarming is supplied to the alarm control ECU 16. The supply of the alarm cancel request signal is performed when an operation of permitting cancellation of alarming or the like is performed by a regular user of the vehicle after the alarm is once given. If the alarm cancel request signal is supplied in the situation of causing the alarm device 20 to give an alarm due to detection of a vehicle theft action, the alarm control ECU 16 supplies to the alarm device 20 an instruction signal that causes the alarm to stop, and supplies to the double lock control ECU 12 an instruction signal that requests to clear the information indicating that there is an alarm record or history, that is, the information indicating that there has been a vehicle theft action. The double lock control ECU 12 clears the information indicating that there is an alarm record or history, that is, the information indicating that there has been a vehicle theft action, in accordance with the above-mentioned clear instruction signal supplied by the alarm control ECU 16.

In the meantime, in the system according to the present embodiment, in order to prevent an occupant of a vehicle from being confined in the vehicle compartment, it is possible to cancel the double lock of the vehicle door by supplying an ignition-on signal indicating an ignition-on state. However, the ignition-on state can be achieved not only by an ignition-on operation performed by a regular vehicle key being inserted into an ignition key cylinder but also by an unjust operation. Thus, when a third person or an unknown person who is not a regular occupant of the vehicle turns on the ignition switch unjustly by breaking into the vehicle compartment unjustly, there may be a situation that the double lock of the vehicle door is cancelled, thereby deteriorating the anti-theft property of the vehicle.

Thus, in the system of the present embodiment, in order to prevent the deterioration of the anti-theft property of a vehicle, unjust cancellation of the double lock of the vehicle door is restricted. A description will be given below, with reference to FIG. 3, of the restriction of the unjust cancellation of the double lock.

In order for an unknown person, who is not a regular occupant of a vehicle, to perform a turning-on operation of an ignition switch unjustly without using a regular vehicle key, the third person must unjustly enter the vehicle compartment before performing the unjust ignition operation. If a third person unjustly enters a compartment of a vehicle equipped with the system of the present embodiment, the unjust act detection sensor 18 normally acts to detect the unjust vehicle theft act, and alarming is performed by the alarm device 20. Therefore, after an alarm is given by the alarm device 20, that is, after a vehicle theft action is detected using the unjust act detection sensor 18, cancellation of the double lock of the vehicle door based on the ignition-on operation is prohibited. By prohibiting cancellation of the double lock of the vehicle door based on the ignition-on operation, the double lock of the vehicle door can be maintained even when a third person enters the vehicle compartment and performs an unjust ignition-on operation, thereby preventing deterioration of the anti-theft property of the vehicle.

As mentioned above, in the system of the present embodiment, the double-lock control ECU 12 of the door lock control device 10 is capable of receiving from the alarm control ECU 16 the information indicating that alarming was made due to occurrence of a vehicle theft action, and is capable of recognizing that there is a record or history of alarming, that is, there was a vehicle theft action, when the information indicating that alarming was made is supplied thereto. In the door lock control device 10, when the record or history indicating an alarm that was given due to a vehicle theft action is detected, cancellation of the double lock of the vehicle door is prohibited even if an ignition-on state is detected.

Figure 3:
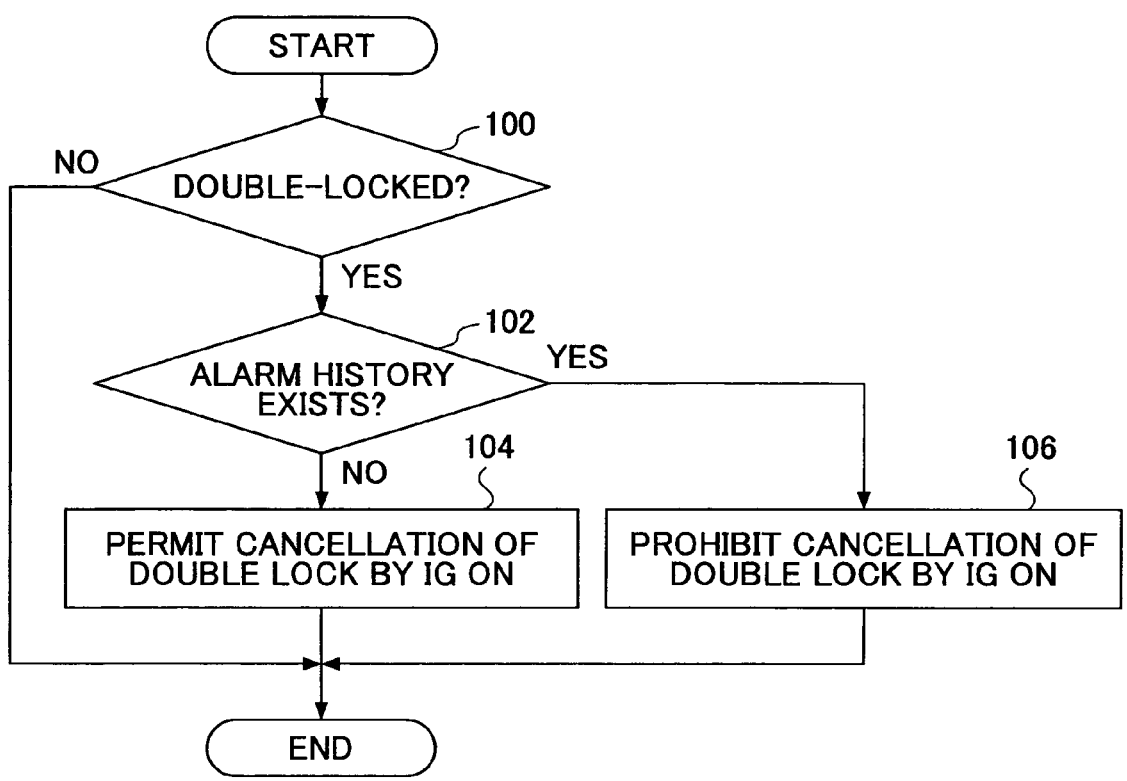
FIG. 3 is a flowchart of a control routine executed by a double lock control ECU in the door lock control device according to the present invention.

FIG. 3 is a flowchart of a control routine executed by the double lock control ECU 12 in the door lock control device 10 according to the present embodiment so as to achieve the above-mentioned function. The control routine shown in FIG. 3 is repeatedly started for every predetermined time period. When the control routine shown in FIG. 3 is started, the process of step 100 is performed first.

In step 100, it is determined whether or not the locked state of a vehicle door is set to the double-locked state where the anti-theft property is relatively high. If it is determined that the vehicle door is not set to the double-locked state, no process will be performed thereafter and the control routine of this time is ended. On the other hand, if it is determined that the vehicle door is set to the double-locked state, then, the process of step 102 is performed.

In step 102, it is determined whether or not alarming was performed by the alarm device 20 based on the signal supplied by the alarm control ECU 16, that is, whether or not a theft action on the vehicle was detected. If there is no record or history of alarming due to a vehicle theft action, it can be determined that there has been no unjust break-in performed on the vehicle. Thus, if such a determination is made, the process of step 104 is performed subsequently. On the other hand, if there is a record or history of alarming due to a vehicle theft action, it can be determined that unjust break-in action was performed on the vehicle and there is a possibility that an unknown person enters the vehicle compartment. Thus, if such a determination is made, the process of step 106 is performed subsequently.

In step 104, a process of permitting cancellation of the double lock based on an ignition-on state is performed. After the process of step 104 is performed, the double-locked state of the vehicle door is cancelled when an ignition-on signal is supplied. After completion of the process of step 104, the routine at this time is ended.

On the other hand, in step 106, a process of prohibiting cancellation of the double lock based on an ignition-on state is performed. After the process of step 106 is performed, the double-locked state of the vehicle door is not cancelled so as to maintain the double-locked state even when an ignition-on signal is supplied. After completion of the process of step 106, the routine at this time is ended.

According to the control routine shown in FIG. 3, under the condition where the double lock of the vehicle door is set, if there is no record or history of alarming by the alarm device 20 detected, that is if there is no vehicle theft action detected using the unjust action detection sensor 18, cancellation of the double lock of the vehicle door based on an ignition-on state is permitted. On the other hand, if there is a record or history of alarming by the alarm device 20 detected, that is, if there is a vehicle theft action detected, cancellation of the double lock of the vehicle door based on an ignition-on state is prohibited.

In the above-mentioned structure, if a regular occupant of the vehicle is confined in the vehicle compartment in a double-lock state, the regular occupant can cancel the double lock by performing a normal ignition operation using the vehicle key. On the other hand, if an unknown person enters the vehicle compartment, the unknown person cannot cancel the double lock even by performing an ignition-on operation. Thus, the double-locked vehicle door cannot unlock to open the door when an unknown person unjustly enters the vehicle compartment by restricting cancellation of the double lock based on an ignition-on operation performed by the unknown person who is not a regular occupant of the vehicle.

Therefore, according to the door lock control apparatus of the present embodiment, while preventing confinement of a regular occupant of a vehicle due to a double lock of a vehicle door, unjust cancellation of the double lock, which provides a relatively high anti-theft property, by an unknown person unjustly entering the vehicle compartment is restricted, thereby permitting prevention of deterioration in the anti-theft property.

It should be noted that, in the door lock control device 10 of the present embodiment, when the cancellation of double lock based on an ignition-on operation due to detection of a vehicle theft action is restricted, cancellation of the double lock according to other methods, such as a mechanical or remote unlocking operation by a regular occupant of the vehicle or an unlocking operation according to a smart system, may be permitted. Thus, the regular occupant of the vehicle can cancel the double locked state according to a normal method even after a vehicle theft action is performed when the vehicle door is set in a double locked state, thereby preventing a situation where the regular occupant cannot cancel the double lock.

In the above-mentioned embodiment, the ignition-on operation corresponds to a predetermined operation; the vehicle theft action corresponds to an unjust act; the normal locked state corresponds to a first locked state; and the double-locked state corresponds to a second locked state.

Moreover, in the above-mentioned embodiment, in-vehicle operation detecting means is achieved by the double lock control ECU 12 detecting an ignition-on state by an ignition-on operation based on an ignition-on signal; locked state canceling means is achieved by the double lock control ECU 12 performing the cancellation of the locked state of the vehicle door when the unlocking operation of the vehicle door or an unlocking operation according to a smart system is performed or when an ignition-on state is detected; unjust act detecting means is achieved by the double lock control ECU 12 detecting a theft action applied to the vehicle using the unjust act detection sensor 18; and locked state cancellation prohibiting means is achieved by the double lock control ECU 12 performing the process of step 106 in the control routine shown in FIG. 3.

It should be noted that although the above-mentioned embodiment is directed to the system in which the double lock of the vehicle door is cancelled when an ignition-on signal based on an ignition-on operation is supplied to the double lock control ECU 12, a method of canceling the double lock is not limited to the method in the system. That is, for example, the present embodiment can be applied to a system in which the double lock is cancelled when an engine as a power source of a vehicle is actually started or a system in which the double lock is cancelled when a signal indicating an engine start permission state due to completion of code check is supplied to the double lock control ECU 12 in an immobilizer system. The immobilizer system is a system in which a code check between an authentication code provided to a vehicle key and an authentication code provided to a vehicle is performed when the vehicle key is inserted into an ignition key cylinder and a start of an engine is permitted when the code check is completed with a result indicating match of the codes. Additionally, the present embodiment is applicable to a system in which the double lock of the vehicle door is cancelled when a predetermined switch operation, such as a switch operation of a predetermined order and a predetermined combination, is performed in the vehicle compartment other than when an ignition-on state is detected or when an engine start permission state is detected according to completion of code check in the immobilizer system.

Moreover, although the cancellation of the double lock based on an ignition-on operation is restricted when an alarm is given by the alarm device 20 due to detection of a vehicle theft action using the unjust act detection sensor 18 in the above-mentioned embodiment, the cancellation of the double lock may be restricted when a vehicle theft action is detected using the unjust act detection sensor 18 irrespective of the alarming by the alarm device 20. In such a case, the cancellation of the double lock may be restricted only when unjust break-in is detected such as at least brakeage of a glass from among vehicle theft actions that can be detected using the unjust act detection sensor 18.

The present invention is not limited to the specifically disclosed embodiments, and variations and modifications may be made without departing from the scope of the present invention.

The present application is based on Japanese priority application No. 2004-147660 filed May 18, 2004, the entire contents of which are hereby incorporated herein by reference.

What is claimed is:

1. A door lock control device that controls a locked state of a door of a vehicle, said door being capable of being set in one of a first locked state and a second locked state, the second locked state providing anti-theft protection higher than the first locked state;

said door lock control device comprising:

in-vehicle operation detecting means for detecting a predetermined operation performed in a compartment of said vehicle;

locked state canceling means for canceling the second locked state of said door when the predetermined operation is detected by said in-vehicle operation detecting means under a condition where said door is set in the second locked state;

said door lock control device being characterized by unjust act detecting means for detecting an unjust break-in to the compartment of said vehicle; and locked state cancellation prohibiting means for prohibiting cancellation of the second locked state by said locked state canceling means (1) after the unjust act is detected by said unjust act detecting means and (2) when the predetermined operation is detected by said in-vehicle operation detecting means.

2. The door lock control device as claimed in claim 1, wherein said in-vehicle operation detecting means detects one of a start state where a power source of said vehicle is started and a start permission state where a start of the power source of said vehicle is permitted.

3. The door lock control device as claimed in claim 2, wherein the start state is an ignition-on state where an ignition switch is turned on to start an engine.

4. The door lock control device as claimed in claim 2, wherein the start permission state is an engine start permission state where a start of an engine is permitted after completion of code check by an immobilizer system.

* * * * *